United States Patent [19]
Ribbens et al.

[11] Patent Number: 5,200,899
[45] Date of Patent: Apr. 6, 1993

[54] METHOD AND SYSTEM FOR DETECTING THE MISFIRE OF AN INTERNAL COMBUSTION ENGINE UTILIZING ANGULAR VELOCITY FLUCTUATIONS

[75] Inventors: William B. Ribbens; Giorgio Rizzoni, both of Ann Arbor, Mich.

[73] Assignee: Regents of the University of Michigan, Ann Arbor, Mich.

[21] Appl. No.: 512,779

[22] Filed: Apr. 20, 1990

[51] Int. Cl.$^5$ .................... F02P 17/00; G01M 15/00; G01L 3/24

[52] U.S. Cl. ................ 364/431.08; 364/431.03; 364/551.01; 123/419; 324/379; 73/116; 73/117.3

[58] Field of Search .............. 364/431.08, 431.07, 364/431.03, 431.01, 508, 511, 431.04, 572, 574, 484, 550, 551.01; 123/419, 436, 416–418, 428, 480; 324/391, 392, 77 R, 379; 73/116, 117.3

[56] References Cited

U.S. PATENT DOCUMENTS

| | | | |
|---|---|---|---|
| 4,083,234 | 4/1978 | Aono et al. | 73/116 |
| 4,337,647 | 7/1982 | Radcliffe et al. | 73/116 |
| 4,357,662 | 11/1982 | Schira et al. | 364/431.08 |
| 4,424,709 | 1/1984 | Meier, Jr. et al. | 73/115 X |
| 4,532,592 | 7/1985 | Citron et al. | 364/431.07 |
| 4,539,841 | 9/1985 | Schroeder et al. | 73/116 |
| 4,550,595 | 11/1985 | Venema | 73/116 |
| 4,562,218 | 1/1986 | Kohama et al. | 364/431.08 X |
| 4,616,617 | 10/1986 | Geiger et al. | 123/419 X |
| 4,691,288 | 9/1987 | Kay et al. | 73/116 |
| 4,697,561 | 10/1987 | Citron | 364/431.07 X |
| 4,800,499 | 1/1989 | Ina et al. | 364/431.03 |
| 4,843,870 | 7/1989 | Citron et al. | 73/116 |
| 4,987,770 | 1/1991 | Nanyoshi et al. | 73/115 |

*Primary Examiner*—Parshotam S. Lall
*Assistant Examiner*—E. Pipala
*Attorney, Agent, or Firm*—Brooks & Kushman

[57] ABSTRACT

A hybrid method and system are disclosed for the detection of internal combustion engine misfires. The method and system are capable of detecting misfires even at very low occurrence rates in real time with inexpensive analog and digital (i.e. hybrid) electronics suitable for use on-board a vehicle, thus satisfying current and proposed exhaust emission control regulations. The method and system exploit a measurement of engine crankshaft angular velocity in conjunction with hybrid electronic signal processing. Once the angular velocity signal is conditioned to minimize the effects of random error and external disturbances, four alternate computationally efficient methods may be used to extract information pertaining to individual cylinder torque productions. Two of the methods employ extremal samples of the estimated torque or velocity waveform to obtain a random torque nonuniformity index or metric. The other two methods utilize a transformation into the frequency domain. All of the methods provide an M-dimensional torque nonuniformity vector of individual cylinder performance for each individual engine cycle. The nonuniformity vector represents a compact and efficient measurement to which statistical decision theory is applied.

42 Claims, 5 Drawing Sheets

METHOD AND SYSTEM FOR DETECTING THE MISFIRE OF AN INTERNAL COMBUSTION ENGINE UTILIZING ANGULAR VELOCITY FLUCTUATIONS

TECHNICAL FIELD

This invention relates to methods and systems for detecting the misfire of an internal combustion engine and, in particular, to method and system for detecting the misfire of an internal combustion engine utilizing angular velocity fluctuations of the engine.

BACKGROUND ART

In recent years, automotive exhaust emission control system performance has become an important issue across the U.S. Virtually all cars sold in the U.S. from the early 1980's have been equipped with a three-way catalytic converter in the exhaust system. In order for this catalytic converter to function correctly, the vehicle is also typically equipped with a fuel control system which maintains a stoichiometric mixture (i.e. Air mass/fuel mass= 14.7).

The long-term performance of automotive exhaust emission control systems is strongly influenced by the physical condition of the catalytic converter. Unfortunately, the catalytic converter is susceptible to irreversible damage from any number of factors.

One of the most likely causes of catalyst degradation is the occurrence of engine misfire. Misfire is a condition in which combustion does not occur in one or more engine cycles in one or more cylinders due, for example, to absence of ignition, or misfueling. Under engine misfire conditions, unburned fuel and air are pumped into the catalyst, greatly increasing its operating temperature. This problem is usually most severe under high load, high speed engine operating conditions, where even a few seconds of misfire can cause catalyst temperatures to soar above 900° C. (1650° F.), causing irreversible damage to the catalyst. Even today's most advanced catalysts generally are unable to sustain continuous operation above 900° C. without damage.

Vehicle operation while misfire is present also contributes to excess emissions, especially when the misfire is present during engine warmup and the catalyst has not reached operating temperature. Obviously, misfire is also undesirable because the engine produces reduced or no torque during the misfiring cycle.

The integrity of the exhaust emission system can best be maintained by monitoring its performance continuously on board the vehicle. It is with the intent of monitoring emission system performance that the California Air Resources Board in 1989 passed regulations which will require all new vehicles after 1994 to be equipped with on-board monitoring systems capable of detecting misfires. These proposed regulations are known as OBDII and may be followed by similar Federal EPA regulations. The proposed regulations are applicable for any misfire condition (e.g. random, continuous, equally spaced, etc.) for the purpose of identifying a malfunction.

There are a variety of methods and systems for detecting misfire. These include the use of crankshaft angular velocity fluctuation, observing the change in oxygen sensor waveform pattern, enhancing the present knock sensor concept to "listen" for the absence of combustion, installation of cylinder pressure transducers, analysis of secondary ignition waveform pattern, use of temperature sensors to detect catalyst temperature during misfire, and others.

The prior art discloses many methods of detecting misfire based upon measurements of torque as derived from noncontacting crankshaft angular velocity measurements. The misfire condition is detected from these torque measurements. These methods of torque measurement are well known. However, each of these methods has certain deficiencies with respect to cost effective, reliable misfire detection as required by the OBDII regulations.

For example, each of U.S. Pat. Nos. 4,843,870, 4,697,561 and 4,532,592 disclose a method of measuring engine torque utilizing digital techniques to sample crankshaft angular velocity. The time between successive fixed angular positions on the crankshaft is measured using a high frequency clock. One sample of crankshaft angular velocity $\omega_i$ is obtained by the relation $$\omega_i = \frac{\theta_i - \theta_{i-1}}{\Delta t_i}$$

where $\theta_i$ and $\theta_{i-1}$ are the crankshaft angular positions. $\Delta t_i =$ time interval.

One of the problems of this digital measurement of angular velocity is the random (or pseudorandom) errors involved. There are two error sources for the digital method: (1) the random variations in measurement of angular position and (2) the timing errors involved in measuring $\Delta t_i$. The first error source results from runout of the crankshaft gear and by variations in the magnetic coupling of the sensor to the crankshaft gear. In order to be practical for torque measurements, these angular velocity measurements must be filtered by means of a digital filter.

Thus the digital measurement of crankshaft angular velocity has the disadvantage of requiring electronic complexity simply to obtain a measurement (with minimum random error) of crankshaft angular velocity. In addition, this digital method has a limited sampling rate which is influenced by the angular separation $\Delta \theta$ ($\Delta v = \theta_i - \theta_{i-1}$). The clock frequency must be extremely high to have an adequate number of counts to achieve the desired sampling rate and achieve the accuracy required to measure $\Delta \theta$. The accuracy of determining $\theta_i$ and $\Delta t_i$ decreases with increasing RPM.

Another deficiency in the digital method is the rather cumbersome method of dealing with engine dynamics. It has long been recognized that calculation of torque from crankshaft angular velocity measurements requires a correction for the forces associated with reciprocating components (i.e. piston, connecting rod). This is illustrated in the reference A. Rizzoni, "A Model for the Dynamics of the Internal Combustion Engine", PhD dissertation, Department of Electrical and Computer Engineering, University of Michigan, Ann Arbor, Mich., February 1986.

Still another deficiency in the references pertaining to torque nonuniformity measurements relative to misfire detection is the lack of any recognition that an index of torque nonuniformity is a random variable. There is no mention of the random nature of engine torque in the prior art references except for those published by the present inventors.

For example, U.S. Pat. No. 4,550,595 discloses an analog circuit-based method of continuously estimating the instantaneous indicated torque of a four cylinder, two stroke/cycle reciprocating internal combustion engine. This patent teaches a method of calculating this torque based upon noncontacting continuous time measurements of crankshaft angular velocity. An exact calculation which accounts for the influence of the inertial forces associated with the reciprocating components on the crankshaft angular dynamics is also taught. There is no suggestion of using the measured torque for any cylinder by cylinder performance measurement and there is no hint of misfire monitoring.

U.S. Pat. No. 3,789,816 discloses a closed loop fuel control system for gasoline fueled reciprocating internal combustion engines. The control system incorporates instrumentation for measuring "engine roughness" (i.e. cylinder to cylinder and cycle to cycle torque imbalance). The roughness signal is obtained by electronic signal processing of crankshaft angular velocity measurements. The electronic signal processing does not account for reciprocating inertia forces.

U.S. Pat. No. 4,292,670 discloses a method for measuring the power and/or compression balance for a diesel engine. The method uses a noncontacting sensor to obtain a signal from the starter ring gear. Using a digital method, estimates are obtained of crankshaft angular velocity with a very limited sampling rate. The angular velocity measurements are then used as a means of estimating the work done by the engine during power stroke without compensating for reciprocating inertial forces in the engine dynamics.

U.S. Pat. No. 4,197,767 discloses a method of fuel control for a gasoline fueled IC. engine during warm-up period. A method of measuring "engine roughness" is provided. This method incorporates a noncontacting sensor for measuring crankshaft angular velocity. Electronic signal processing generates a signal which is indicative of engine roughness. However, there is no teaching of reciprocating inertia compensation. Furthermore, there is no hint of any relationship between the engine roughness signal and actual engine misfire.

SUMMARY OF THE INVENTION

An object of the present invention is to provide a method and system for detecting relatively low occurrence rates of engine misfires in real time in a reliable and cost effective fashion.

Another object of the present invention is to provide a method and system for detecting low occurrence rates of engine misfire in real time without requiring that a number of consecutive misfires occur in the same cylinder.

Still another object of the present invention is to provide a method and system for detecting relatively low levels of engine misfire in real time wherein single misfire events may be spaced randomly among mostly firing cycles.

In carrying out the above objects and other objects of the present invention, a method is provided for detecting the misfire of a reciprocating internal combustion engine having a plurality of reciprocating components, at least one cylinder and a crankshaft. The method includes the steps of measuring the angular velocity of the crankshaft to obtain an electrical signal representation thereof and filtering the electrical signal to minimize the effects of random error and disturbances in the electrical signal to obtain a filtered angular velocity signal. The method further includes the step of calculating an M-dimensional nonuniformity vector derived from the filtered angular velocity signal. M is proportional to the number of cylinders of the engine. Then an index of torque nonuniformity is computed based on the M-dimensional vector. The index of torque nonuniformity represents the variation in torque from cylinder to cylinder and from cycle to cycle. Finally, a statistical decision algorithm is applied to one or the other of the index of torque nonuniformity and the torque nonuniformity vector. The algorithm statistically distinguishes between a true misfire and normal cyclic variability which characterizes the combustion process in each cylinder of the engine, to thereby obtain a misfire signal.

Misfire can also be detected by statistical pattern recognition methods applied to the torque nonuniformity vector, and from the frequency domain equivalent of the torque signal without computing the index of torque nonuniformity.

Further, the algorithm can compute the thresholds required to satisfy the misfire criteria specified by regulatory agencies, and the associated probabilities of false alarm and missed detection. The preferred embodiment of the present invention in particular is configured for optimal application of statistical decision theory for reliably detecting misfire even at the lowest occurrence rates.

Also provided is a system for carrying out each of the method steps.

Four possible embodiments are provided for carrying out the calculating step.

The objects, features and advantages of the present invention are readily apparent from the following detailed description of the best mode for carrying out the invention when taken in connection with the accompanying drawings.

BRIEF DESCRIPTION OF THE BEST MODE

Figure 1:
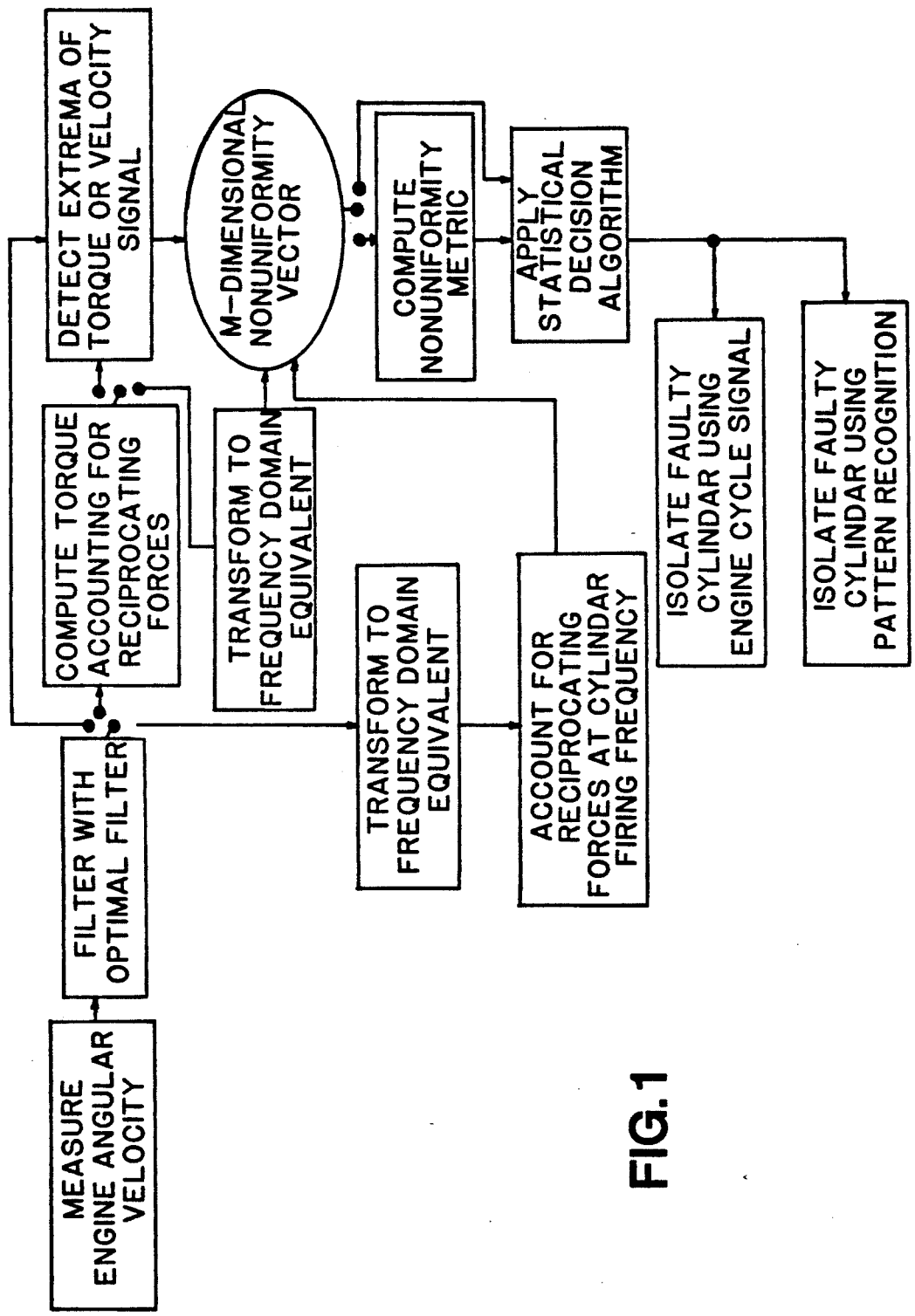
FIG. 1 is a block diagram of the method of the present invention.
Figure 2:
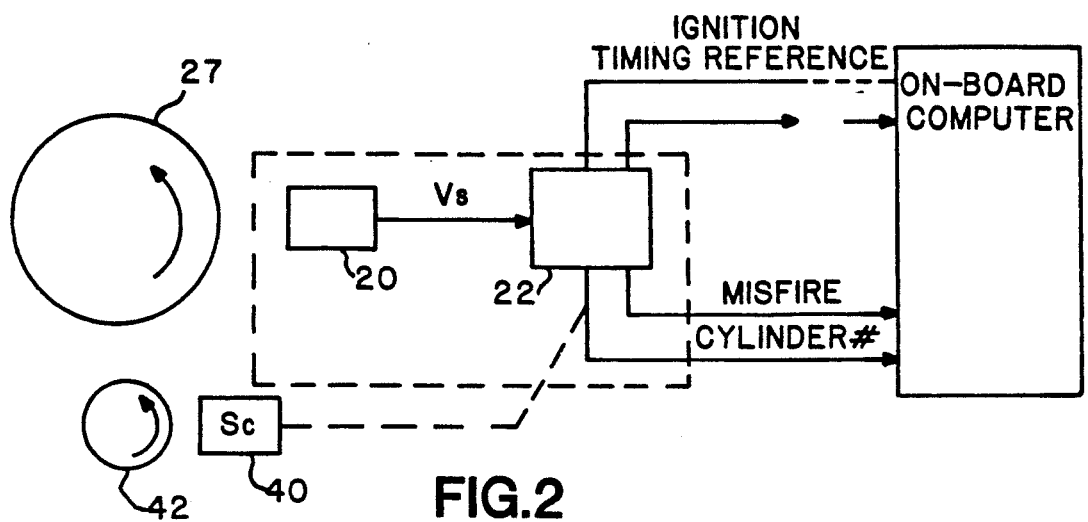
FIG. 2 is a block diagram of the system of the present invention.

Referring now to the drawing figures, there is illustrated in FIGS. 1 and 2 the method and system for detecting the misfire of a reciprocating IC. engine utilizing angular velocity fluctuations. As indicated in FIG. 1, four possible methods are provided for such detection.

Figure 3:
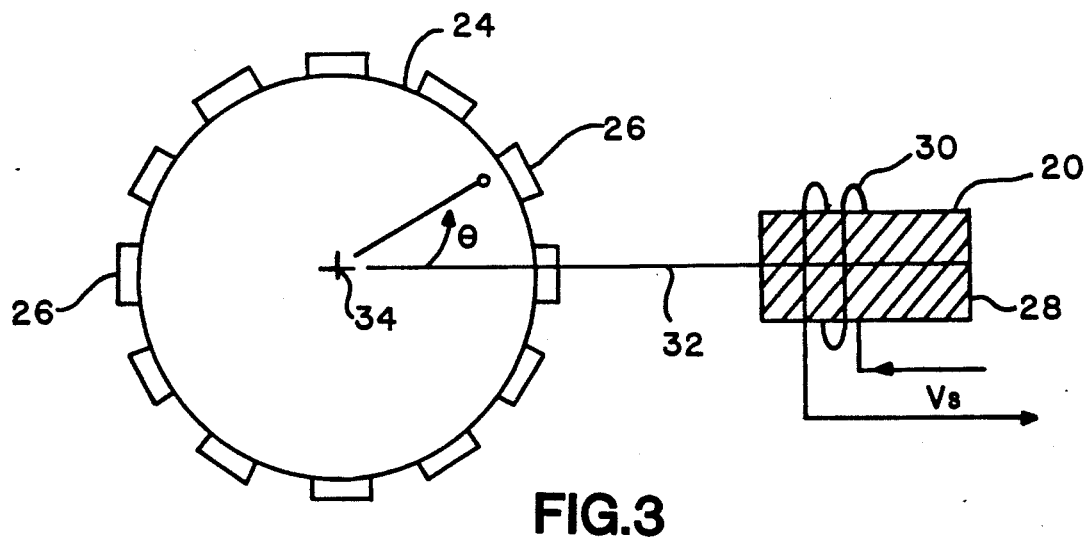
FIG. 3 is a schematic diagram of a crankshaft position sensor for use in the present invention.

FIGS. 2 and 3 illustrate a crankshaft position sensor, generally indicated at 20, which generates an output signal, $V_s$, which is the primary input to an electronic signal processing unit, generally indicated at 22. A variety of sensor configurations are potentially possible including magnetic induction, Hall effect, optical, etc.

In the embodiment of FIG. 3, a ferromagnetic disk, generally indicated at 24, with M uniformly spaced lugs 26 is coupled magnetically to the sensor 20. The disk 24 is mounted for rotation with a crankshaft 27 of an internal combustion engine.

In this embodiment of the sensor 20, the sensor 20 includes a permanent magnet 28 around which a coil 30 is wound. The magnetic flux linkage varies periodically with crankshaft angle $\theta$ because the magnetic coupling varies with spacing between the sensor 20 and the disk 24. This spacing is smallest whenever any lug 26 is symmetrically positioned along the center line ($C_L$) 32 of the crankshaft axis 34 and coil axis as shown. The magnetic flux linkage for the coil 30 is smallest whenever any pair of lugs 26 are symmetrically positioned relative to the center line 32. The angular period of the periodic flux linkage is $$\frac{2\pi}{M}$$

radians (or 360°/M degrees) where M is the number lugs 26 on the disk 24.

As the crankshaft 27 rotates about its axis 34, the sensor 20 generates an output voltage v.(t) in accordance with Faraday's law. The instantaneous frequency of the sensor voltage, $\omega_s(t)$ is related to the instantaneous crankshaft angular frequency $\omega_e(t)$ by:

$$\omega_s(t) = M\omega_e(t) \quad \text{(ideal model)}$$

$$\omega_s(t) = M\omega_e(t) + y(t) \quad \text{(practical model)}$$

The practical model contains a term y(t) which is a pseudo-random process associated with imperfections in the uniformity of the coupling of the sensor to the lugs 26 on the disk 24.

There are two distinct methods of obtaining the measurement of crankshaft angular velocity from the sensor output: (1) analog, and (2) digital. In one digital method, the time interval between successive zero crossings at the sensor voltage $\tau_i$ is measured. For each such measurement, an estimate $\omega_i$ of angular speed is obtained.

$$\omega_i = \frac{2\pi}{\tau_i} \quad \text{ideal relationship}$$

$$\omega_i = \frac{2\pi + \delta\theta_i}{\tau_i + \delta\tau_i} \quad \text{practical model}$$

In the practical model, errors $\delta\theta_i$ and $\delta\tau_i$ occur due respectively to:

$\delta\theta_i$ = errors due to runout and imperfections in uniformity of lug spacing $\delta\tau_i$ = time interval errors In the digital method, there are three error sources in each estimate of $\omega_i$. The timing errors associated with measuring $\tau_i$, the errors in $\tau\theta_i$ due to imperfections in tooth to tooth spacing and/or magnetic coupling and the errors in $\delta\theta_i$ due to runout can be reduced by digital filtering of $\omega_i$. However, the runout error generates an error signal the spectrum of which overlaps the spectrum of the engine angular velocity signal during misfires and, in general, cannot be separated from measurements of $\omega_i$.

Figure 4:
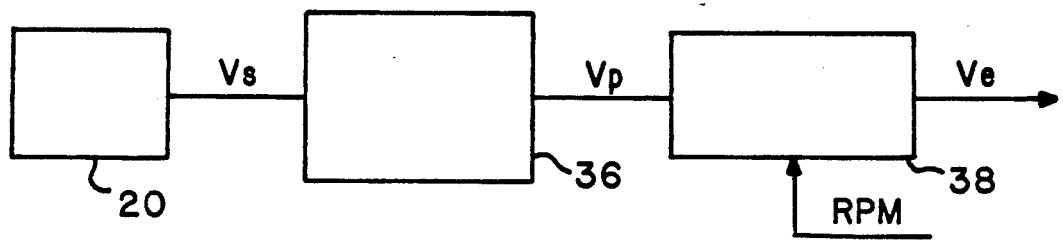
FIG. 4 is a block diagram of a part of the system for obtaining an analog voltage which is proportional to the angular velocity of the crankshaft.

The analog method of the present invention is preferred and is illustrated in FIG. 4. The method uses an analog frequency to analog converter 36 along with a variable band pass filter 38 to obtain an analog voltage which is proportional to $\omega_i$.

The variable filter 38 is a band pass filter whose pass band frequencies are adjusted in accordance with crankshaft average angular speed (i.e. RPM), so that the filter selectively remains constant with varying engine speed. This engine speed-dependent filtering is important to the effectiveness of the misfire detection method of the present invention, as it effectively provides a signal to noise ratio which is constant at all engine speeds, and an effective signal bandwidth which is constant at all engine speeds. One of the common drawbacks of other proposed methods is the inability to perform accurate detections at high speeds. The method discussed here does not suffer such limitations, because as engine speed is increased, little additional noise is introduced even though it is recognized that at high engine speeds camshaft and accessory loading add complexity to the dynamic motion of the crankshaft. However, one of the strengths of the frequency domain approach taught herein with respect to two embodiments of the present invention is the ability to separate the frequency domain component of crankshaft speed at the firing frequency (which is due to the combustion event) from such interference events as those described above, thereby facilitating the detection of misfires at all engine speeds.

The same is also accomplished in the time domain approach, also taught herein. Due to the optimal filtering algorithm, which eliminates the higher harmonics of the angular speed signal uniformly at all engine speeds, and owing to the fact that the misfire process generates energy only at subharmonics of the engine firing frequency, the time domain approach also achieves good detection of misfires in the presence of additional vibrations induced by such factors as camshaft loading or driveline road-induced excitation.

Another advantage of the present invention is the ability to distinguish individual misfiring cylinder(s). This is accomplished by means of a so-called engine cycle signal. This signal is generated once for each engine cycle (i.e. once for each two revolutions for a four-stroke/cycle engine and once per revolution for a two-stroke/cycle engine). Typically, such a signal is generated by a sensor 40 which is activated by a specific point on the engine camshaft 42, as illustrated in FIG. 2. For example, a magnetic sensor can be positioned close to a lug on the camshaft. A voltage pulse is generated each time this lug rotates past the sensor axis.

Detection of Torque Extrema

The successful implementation of the misfire detection method of two of the embodiments of the present invention requires algorithms which are capable of identifying the extrema of the engine torque or velocity waveform. The torque waveform is derived from the analog waveform of the filtered velocity signal. The present section illustrates how the detection of the extrema of the torque waveform can be accomplished either in the time, or frequency domain. Either interpretation leads to the same result: it is possible to determine the relative torque produced by each cylinder, and therefore isolate the occurrence of misfires on a cylinder-by-cylinder and cycle-by-cycle basis.

Method 1: Time Domain

This section describes the preferred algorithm for the computation of the extrema of the engine torque or velocity waveform based on the measurement of crankshaft angular velocity. It is assumed that a sampled analog engine angular velocity signal, $\omega(\theta_n)$, is available at N samples/stroke. The minimum number of samples required to implement this algorithm is in theory equal to two samples per stroke, although the method has been empirically demonstrated to work in the case of a single sample per stroke.

Figure 5:
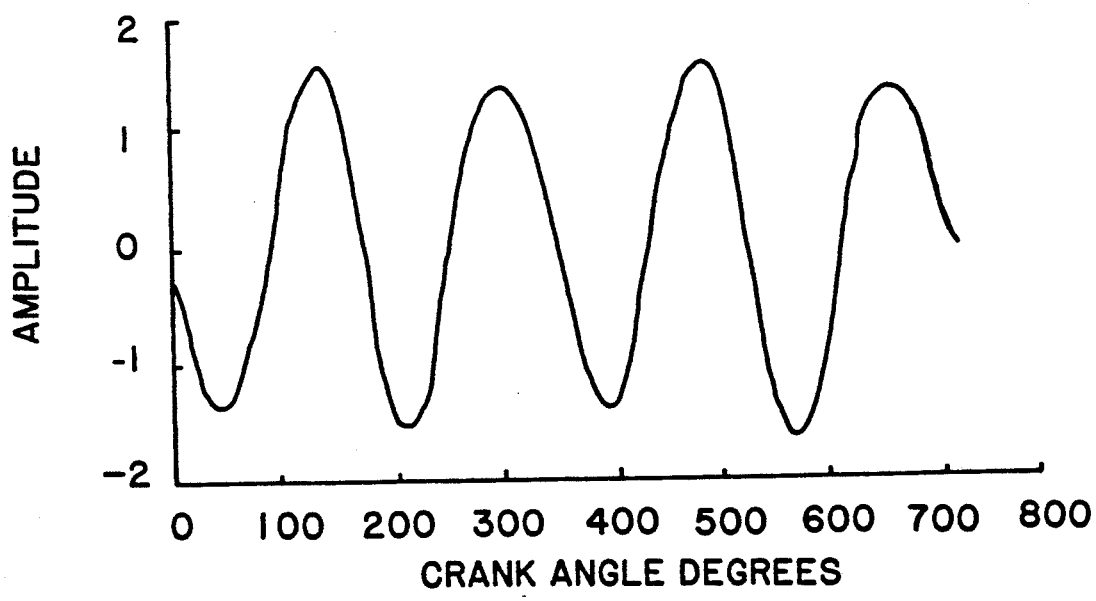
FIG. 5 is a graph of reciprocating inertia torque, normalized to engine speed and reciprocating mass.

As noted in the above-noted reference in the name of G. Rizzoni, in order to compute the torque waveform from the angular velocity waveform, one needs to account for the effect of the reciprocating inertia torque as illustrated in FIG. 5 (i.e. that caused by the reciprocating motion of the piston in the cylinder). The correction for the effects of the reciprocating motion on the angular velocity signal is based on the notion that the angular velocity signal is made up of three components: the first consists of the velocity fluctuations which occur as a consequence of the combustion process; the second is due to the unavoidable reciprocating inertia torque due to the geometry of the crank-slider mechanism, which couples the combustion produced forces to the crankshaft 27; the third is due to the superposition of any other forces exciting an oscillation of the crankshaft 27 about its axis 34, including resonances, road-induced vibration, and accessory loads. The road induced disturbance term has been experimentally shown to be negligible in most cases, due to the elastic coupling which typically exists between the crankshaft 27 and the driveshaft (either by means of a clutch plate, or by the torque converter fluid). The net effect of all these components is viewed as consisting of essentially random noise. The following expressions illustrate this subdivision:

$$\omega(\theta_n) = \omega_f(\theta_n) + \omega_r(\theta_n) + \epsilon(\theta_n)$$

In order to correct for the effects of the reciprocating inertia torque on the angular velocity signal, it is necessary to subtract the term $\omega_r(\theta)$ from the measured angular velocity. As illustrated in the reference G. Rizzoni "A Model for the Dynamics of the Internal Combustion Engine", PhD dissertation, Department of Electrical and Computer Engineering, University of Michigan, Ann Arbor, Mich., February 1986, such a correction term amounts to the product of a known function of crank angle $f(\theta)$, times the square of the average engine RPM. The function $f(\theta)$ is determined by the geometry of the reciprocating assembly, and can be precomputed for any engine class given. An approximate expression for the reciprocating inertia torque, normalized with respect to engine speed and reciprocating mass, is given by equation below for a four cylinder in-line engine configuration; corresponding expressions may be obtained for six and eight-cylinder engines in various configurations. The approximation used below is adequate for the purpose of estimating the net engine torque applied at the crankshaft throw.

$$f(\theta) = -M_{EQ}R^2 \left( \cos\theta + \frac{R}{2L} \cos 2\theta \right)\left( \sin\theta + \frac{R}{2L} \sin 2\theta \right)$$

where R is the crank throw, L is the connecting rod length, $M_{EQ}$ is the equivalent reciprocating mass and $\theta$ is the crank angle.

Once the correction for reciprocating inertia has been effected, the resulting discrete waveform is directly related to the net engine torque produced by the engine, and its extrema can be used to compute a torque nonuniformity index or metric as discussed hereinbelow.

The values of the function $f(\theta)$ may be precomputed and stored in a table for use by the processor; thus, the correction can take place simultaneously with the sampling of the analog engine speed waveform.

An M-dimensional vector of torque extrema also discussed and defined hereinbelow, wherein M number of cylinders, $$n = T - T_{av} u$$

may be used to isolate the cylinder(s) responsible for the misfiring condition very effectively, upon application of some simple pattern recognition methods. The computation of the nonuniformity metric described hereinbelow is utilized to detect to occurrence of a misfiring condition. Once such a condition is detected, the problem becomes that of isolating the faulty cylinder(s).

Figure 6:
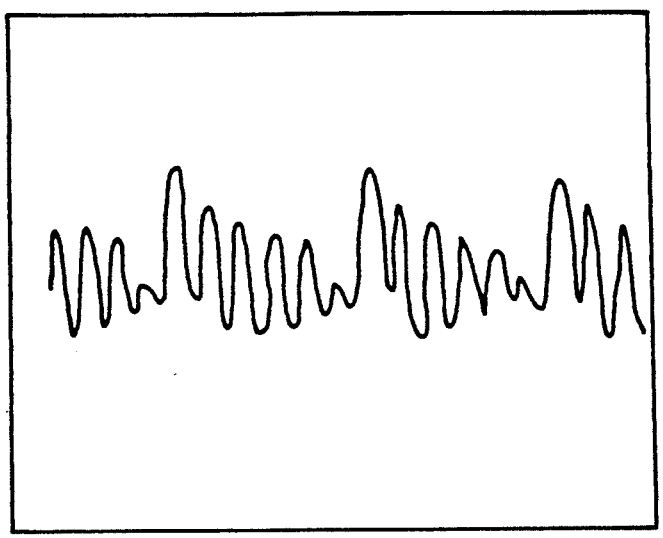
FIG. 6 is a graph illustrating angular velocity waveforms associated with one type of misfire condition.

Each misfire pattern is characterized by a specific vector $n^k$, where the index k corresponds to the type of misfiring pattern. For example, $k=0$ might correspond to the condition "no misfire", $k=1$ to "misfire in cylinder No. 1", $k=3,1$ to "misfire in cylinders 3 and 1". Thus, each misfire condition is characterized by a unique vector signature. FIGURE 6 illustrates a few misfiring waveforms, corresponding respectively to: no misfire; a single cylinder misfire; and two cylinder misfires in consecutive strokes, separated by one stroke, and separated by two strokes. The figure corresponds to actual engine data, the algorithm described above converts the sampled velocity waveform shown in FIG. 6 into a 2N-vector of extrema.

Each of the vectors $n^k$ generates a point in 2N-dimensional euclidean space. As many points as misfire conditions can be represented in this space. The pattern recognition problem consists of determining which point the observed vector of extrema is closest to (based on a normal metric), given the known misfire pattern. The distance between the observation and each of the points in 2N space is represented by the shortest vector, according to the principle of orthogonal projections. Let this distance, $\delta$, be defined as follows, in vector form:

$$\delta^k = n^k - n$$

where is the observed vector of extrema corresponding to a specific engine cycle. Then the problem of isolating the misfiring cylinder is reduced to computing a norm of $\delta^k$ (any $L_p$ norm will suffice), and finding the minimum value: $\min\{// \delta^k //\}$. This minimum indicates the "nearest neighbor", and therefore isolates the cylinder(s) which are the most probable cause of misfire. Experiments performed on production vehicles have verified that if this nearest neighbor classification is executed on the basis of a single cycle of engine velocity data, the correct classification is made with an error rate of three incorrect classifications in one thousand cycles. If the average of two consecutive cycles is computed, our experiments indicated zero errors over a sample space of 5,000 cycles.

METHOD 2:

Frequency Domain

An equivalent result may be obtained by transforming the analog waveform to its frequency domain equivalent. The frequency domain method may be even more effective in recovering the individual cylinder torque information, leading to the detection of misfires.

Let $\lambda$ represent angular frequency (which is canonically conjugate to crank angle) and $F$ represent a crank angle to angular frequency domain transformation, such as a Discrete Fourier Transform (DFT) performed on a number of samples of the analog velocity waveform, i.e., $F(f(\theta)) = F(\lambda)$.

Then at where the latter represents the firing frequency of the engine, the energy in the waveform is due to three components, as described earlier:

$$\omega(\theta) = \omega_i(\theta) + \omega_r(\theta) + \epsilon(\theta)$$

where
- $\omega_i$ = indicated component minus friction (combustion exciting crankshaft)
- $\omega_r$ = reciprocating component
- $\epsilon$ = error due to random and nonrandom excitations of the crankshaft (e.g.: road induced, resonances, etc...)

Let the frequency domain equivalents of the above be $\Omega_i$, $\Omega_r$, and $E$, respectively.

The spectrum of $\Omega_i$ and $\Omega_r$ can by definition be obtained exactly by a DFT because of the periodic nature of the excitation in the crank angle domain. Since $\omega_r(\theta)$ is a periodic function of $\theta$, its Fourier series expansion is finite and can be derived exactly.

Figure 7:
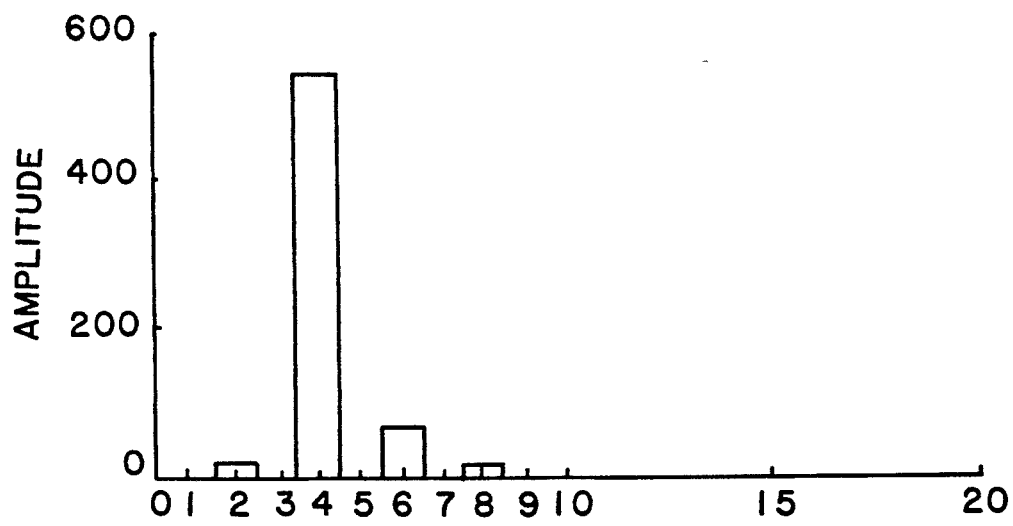
FIG. 7 is a spectrum of reciprocating inertia torque.

FIG. 7 depicts the exact spectral distribution of the reciprocating inertia component of engine torque at the crankshaft 27, for an engine with a reciprocating mass equal to $M_{EQ}$, and rotating at an average speed of RPM. The relative amplitude of the components is determined by the ratio of crank throw to connecting rod length, which is assumed equal to 0.25 in this plot (this is a typical value in SI engine designs).

Due to the geometry of the reciprocating assembly, the strongest periodicity of $\omega_r$ is in $2\lambda_f$, therefore, its effects at the firing frequency are not as pronounced as they are at the first harmonic of firing frequency. The strength of the signal $\Omega_r$, at each harmonic is a function of engine (average) RPM.

Figure 8:
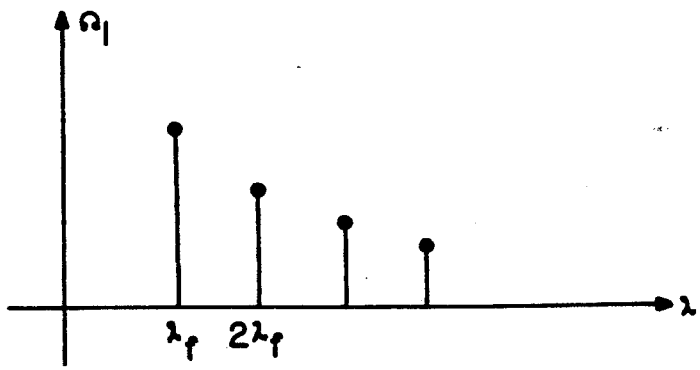
FIG. 8 is a spectrum of the indicated component of engine angular velocity.

By contrast, the signal $\Omega_i$ is dependent on the combustion and friction processes only, and most of its energy is at the spatial frequency $\lambda_f$ as illustrated in FIG. 8.

The process $F(\lambda) = F(f(\theta))$ is considered a noise process. Its spectrum consists of the super-position of signals due to two effects: i) random vibrations propagating to the structure as a consequence of external excitation; ii) structural resonances excited by the combustion process (e.g.: the influence of the dynamic motion of the valves). Such processes are not periodic in terms of engine revolution, but exhibit an overall behavior which can be characterized as additive random noise at the frequency $\lambda_f$. Thus, the energy released during the combustion process is highly correlated with the component of $\Omega_i$ at $\lambda_f$.

The recovery of $\Omega_i(\lambda_f)$ can be accomplished by a DFT of $\omega(\theta)$, where the sampling occurs synchronously with crank angle position, followed by a correction for the reciprocating inertia component at the frequency $\lambda_f$. It is thus sufficient to evaluate $\Omega_i$ at the spatial frequency $\lambda_f$ only, and to simply operate the correction for $\Omega_r$, at that frequency.

Torque Estimation

The principle which makes the misfire detection method feasible is that it is possible to obtain an estimate of the indicated torque produced by each cylinder from a measurement of the fluctuations in crankshaft angular velocity. Either the time domain or the frequency domain method is adequate to estimate individually produced cylinder torque. This result has been known for several years, as documented in the above-noted reference in the name of Rizzoni.

Figure 9:
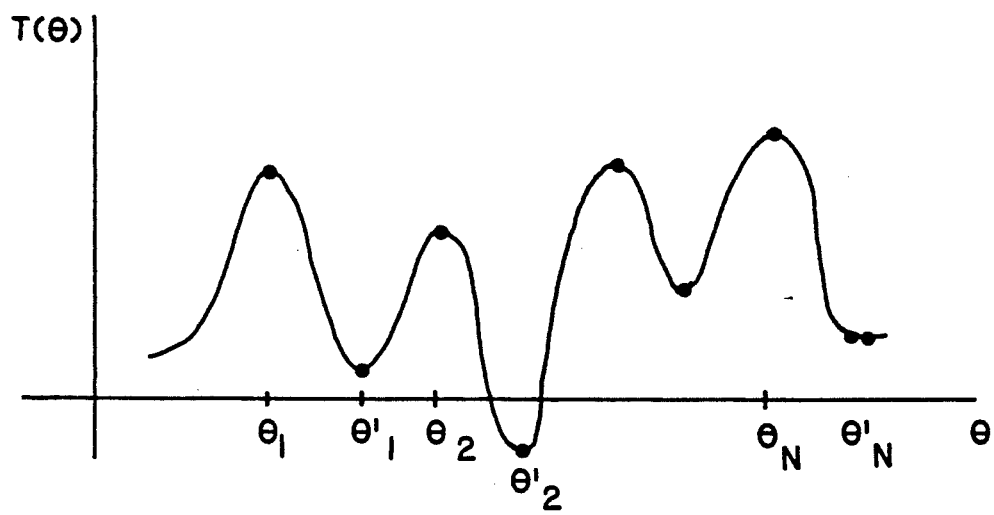
FIG. 9 is a graph of a torque waveform with samples of its extremal values.
Figure 10:
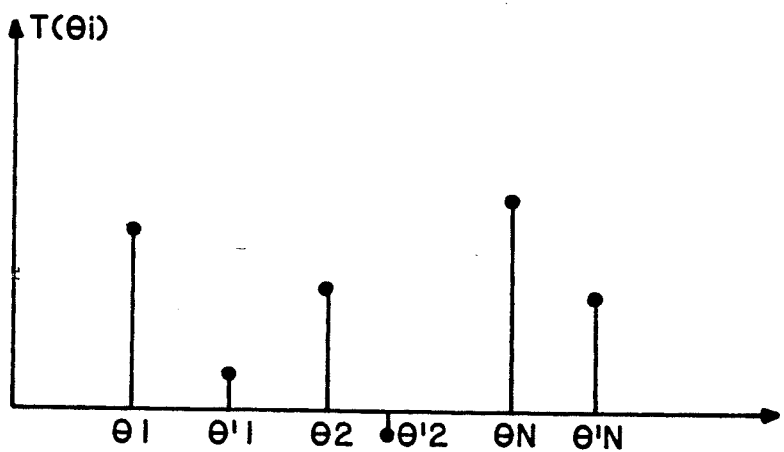
FIG. 10 is a graph of typical torque vector data.

The torque nonuniformity measurement is derived from samples of the extremal values of the torque waveform as illustrated in FIG. 9. Whereas, FIG. 10 illustrates typical torque vector data.

In FIG. 9, the torque $T(b)$ is represented as a function of crankshaft angle $\theta$. Each cycle represents the torque generated by a particular cylinder. By sampling $T(\theta)$ at the extremal values, the essential features of the nonuniformity are maintained. This is true because the shape of the torque waveforms between combustion events is determined by the combustion pressure as a function of crank angle and by the crank-slider geometry of the engine. The crankshaft angles and associated torques at the extremal values are denoted:

- $\theta_n$ = crankshaft angle for relative maximum associated with cylinder n
- $\theta_n'$ = crankshaft angle for relative minimum associated with cylinder n $$T_n = T(\theta_n)$$
$$n = 1, 2, \ldots N$$
$$T_n' = T(\theta_n')$$

These values are obtained for each engine cycle and an M-dimensional vector is computed, where $M = 2N$ in the preferred embodiment and where the superscript $T$ denotes the transpose of the vector.

$$T^T = [T_1, T_1', \ldots T_n, T_n'].$$

The average value for the 2N components $T_{av}$ is then found.

$$T_{av} = \frac{1}{2N} \sum_{n=1}^{N} (T_n + T_n')$$

The a 2N-dimensional vector representing torque nonuniformity is computed.

$$n = T - T_{av} u.$$

where $u^T = [1, -1, 1, -1, \ldots]$ is a 2N dimensional vector.

If the torque produced by the engine during a given cycle were absolutely uniform, then n would be a 2N-dimensional null vector. In reality n is never a null vector owing to cyclic variability of combustion and to misfire, if present. A metric n is computed for representing torque nonuniformity and for detecting misfire, which is called the torque nonuniformity index or metric. This metric is computed by evaluating the norm of a vector which indicates the deviation from ideal engine performance caused by any nonuniformity in the generation of torque.

Any $L_p$ norm is adequate for the purpose of detecting the presence of a misfire; the two most common choices are:

$$n = \|n\|_1 \qquad L_1 \text{ norm}$$

$$n = \|n\|_2 \qquad L_2 \text{ norm}$$

Although either norm of will suffice for misfire detection, the $L_1$ norm is normally preferred because it is more efficiently computed (it does not require square and square-root operations and can be done in integer arithmetic format, facilitating the onboard computation and misfire detection).

Figure 11:
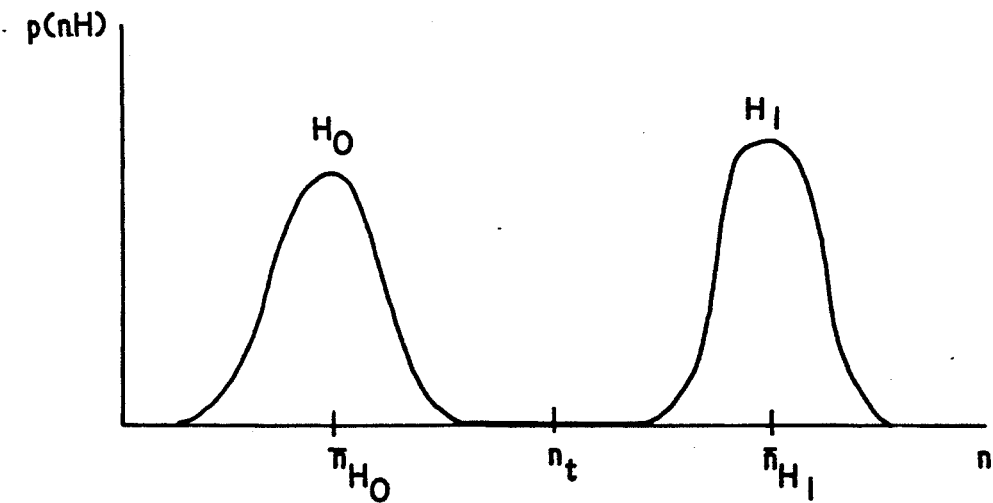
FIG. 11 is a graph of the probability density function for the random variable N under normal engine operation and misfire in one cylinder.

Detection of misfire is done on a statistical hypothesis testing basis. FIG. 11 is a graph of the probability density function for the random variable n under the two hypotheses.

$H_0$: normal engine operation
$H_1$: misfire in one cylinder (not necessarily the same for each cycle).

The left distribution in FIG. 11 represents the statistics of the random fluctuations in random variable n for normal engine operation. This distribution results from normal cyclic variability in combustion. The distribution on the right corresponds to the statistics in the event of one misfire in each engine cycle. The distribution is the same regardless of which cylinder misfires. The cylinder number of the single misfiring can be randomly changing from cycle to cycle.

The detection of misfire can be based on a variety of criteria according to statistical decision theory. One particularly simple test can be applied to the nonuniformity index n for each engine cycle by selecting a threshold $n_t$ midway between the mean values $\bar{n}_{H0}$ for normal operation and $\bar{n}_{H1}$ or misfire.

$$\text{i.e., } n_t = \frac{\bar{n}_{H1} + \bar{n}_{H0}}{2}$$

This particular choice of thresholds corresponds to assigning equal costs to false alarms and missed detections.

The following criterion for misfire detection is applied in the present embodiment.

$n > n_t \rightarrow$ misfire
$n < n_t \rightarrow$ normal operation.

There are two types of errors made by such a method:
1. $n < n$ for a misfiring cycle
2. $n > n_t$ for a normal cycle.

The probability for such errors is:

$$p_e = \int_{n_t}^{\infty} p_{H0}(n)dn + \int_{0}^{n_t} p_{H1}(n)dn$$

From actual experimental data, the error rate for a typical engine is less than 0.5%. The confidence level for errors at this rate is greater than 99%.

The invention has been described in an illustrative manner and, it is to be understood that, the terminology which has been used is intended to be in the nature of words of description rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. A method for detecting the misfire of a reciprocating internal combustion engine having a plurality of reciprocating components, at least one cylinder and a crankshaft, the method comprising the steps of:
   measuring the angular velocity of the crankshaft to obtain an electrical signal representation thereof;
   filtering the electrical signal to minimize the effects of random error and disturbances in the electrical signal to obtain a filtered angular velocity signal;
   calculating an M-dimensional torque nonuniformity vector derived from the filtered angular velocity signal, where M is proportional to the number of cylinders of the engine; and
   applying a statistical decision algorithm to the torque nonuniformity vector, which algorithm statistically distinguishes between a true misfire and normal cyclic variability which characterizes the combustion process in each cylinder of the engine, to thereby obtain a misfire signal.

2. A method for detecting the misfire of a reciprocating internal combustion engine having a plurality of reciprocating components, at least one cylinder and a crankshaft, the method comprising the steps of:
   measuring the angular velocity of the crankshaft to obtain an electrical signal representation thereof;
   filtering the electrical signal to minimize the effects of random error and disturbances in the electrical signal to obtain a filtered angular velocity signal;
   calculating an M-dimensional torque nonuniformity vector derived from the filtered angular velocity signal, where M is proportional to the number of cylinders of the engine;
   computing an index of torque nonuniformity based on the M-dimensional vector, the index of torque nonuniformity representing the variation in torque from cylinder to cylinder and from cycle to cycle; and
   applying a statistical decision algorithm to one of the torque nonuniformity vector and the index of torque nonuniformity, which algorithm statistically distinguishes between a true misfire and normal cyclic variability which characterizes the combustion process in each cylinder of the engine, to thereby obtain a misfire signal.

3. The method as claimed in claim 1 or claim 2 wherein the step of measuring includes the step of obtaining a signal from a sensor coupled to the crankshaft whose instantaneous frequency is proportional to the instantaneous crankshaft angular velocity.

4. The method as claimed in claim 3 wherein the step of measuring is at least partially performed by an analog circuit to obtain an analog of the angular velocity signal.

5. The method as claimed in claim 4 further comprising the step of converting the analog of the angular velocity signal to an analog voltage signal which is a function of the frequency of the analog velocity signal.

6. The method as claimed in claim 5 wherein the step of filtering is performed on the analog voltage signal.

7. The method as claimed in claim 1 or claim 2 further comprising the step of generating an average angular velocity signal which is proportional to the average angular velocity of the crankshaft.

8. The method as claimed in claim 7 wherein the step of filtering is accomplished with a variable band pass filter having a variable band determined as a function of average angular velocity to preserve the information required to detect misfires independent of r.p.m..

9. The method as claimed in claim 1 or claim 2 wherein a statistical pattern recognition algorithm is used for detecting at least one misfire cylinder based on the misfire signal.

10. The method as claimed in claim 1 or claim 2 wherein the step of calculating includes the step of estimating indicated torque provided by each cylinder based upon said crankshaft angular velocity in which the appropriate engine dynamics, including reciprocating inertia forces, are taken into account to obtain an indicated torque signal.

11. The method of claim 10 wherein the step of calculating includes the step of determining the extrema of the indicated torque signal which extrema comprise the elements of the M-dimensional nonuniformity vector.

12. The method as claimed in claim 10 wherein the indicated torque signal has an analog waveform and wherein the step of calculating includes the step of transforming the analog waveform of at least a portion of the indicated torque signal to a frequency domain equivalent for each cylinder within each engine cycle, which frequency domain equivalents comprise the elements of the M-dimensional nonuniformity vector.

13. The method as claimed in claim 1 or claim 2 wherein the step of calculating includes the step of determining the extrema of the filtered angular velocity signal, which extrema comprise the elements of the M-dimensional nonuniformity vector.

14. The method as claimed in claim 1 or claim 2 wherein the filtered angular velocity signal has an analog waveform and wherein the step of calculating includes the step of transforming the analog waveform of at least a portion of the filtered analog velocity signal to a frequency domain equivalent.

15. The method as claimed in claim 13 further comprising the steps of determining at least one frequency related to a firing frequency of the engine and determining the portion of the frequency domain equivalent which is due to combustion energy effectively exciting the crankshaft at the at least one frequency to thereby account for the torque attributable to the reciprocating forces.

16. The method as claimed in claim 2 wherein the step of applying includes the step of comparing the index of torque nonuniformity with a threshold value to obtain the misfire signal.

17. The method as claimed in claim 16 wherein whenever the index of torque nonuniformity exceeds the threshold value for any given engine cycle a misfire is declared, otherwise normal operation is determined for the given engine cycle.

18. The method as claimed in claim 17 wherein the threshold value is predetermined based on a predetermined statistical measure of the index of torque nonuniformity for both normal engine operation and an engine misfire.

19. The method of claim 16 or claim 18 further comprising the steps of generating an engine cycle signal as a function of the particular cycle of the engine and identifying at least one misfiring cylinder as a function of the engine cycle signal and the nonuniformity vector.

20. The method as claimed in claim 1 or claim 2 further comprising the steps of generating an engine cycle signal as a function of the particular cycle of the engine and identifying at least one misfiring cylinder as a function of the misfire signal and the nonuniformity vector.

21. The method as claimed in claim 1 or claim 2 further comprising the step of detecting which of the cylinders has misfired based on the nonuniformity vector.

22. A system for detecting the misfire of a reciprocating internal combustion engine having a plurality of reciprocating components, at least one cylinder and a crankshaft, the system comprising:
 means for filtering the electrical signal to minimize the effects of random error and disturbances in the electrical signal to obtain a filtered angular velocity signal;
 means for calculating an M-dimensional torque nonuniformity vector derived from the filtered angular velocity signal, where M is proportional to the number of cylinders of the engine; and
 means for applying a statistical decision algorithm to the torque nonuniformity vector, which algorithm statistically distinguishes between a true misfire and normal cyclic variability which characterizes the combustion process in each cylinder of the engine, to thereby obtain a misfire signal.

23. A system for detecting the misfire of a reciprocating internal combustion engine, having a plurality of reciprocating components, at least one cylinder and a crankshaft, the system comprising:
 means for measuring the angular velocity of the crankshaft to obtain an electrical signal representation thereof;
 means for filtering the electrical signal to minimize the effects of random error and disturbances in the electrical signal to obtain a filtered angular velocity signal;
 means for calculating an M-dimensional torque nonuniformity vector derived from the filtered angular velocity signal, where M is proportional to the number of cylinders of the engine;
 means for computing an index of torque nonuniformity based on the M-dimensional vector, the index of torque nonuniformity representing the variation in torque from cylinder to cylinder and from cycle to cycle; and
 means for applying a statistical decision algorithm to one of the torque nonuniformity vector and the index of torque nonuniformity, which algorithm statistically distinguishes between a true misfire and normal cyclic variability which characterizes the combustion process in each cylinder of the engine, to thereby obtain a misfire signal.

24. The system as claimed in claim 22 or claim 23 wherein the means for measuring includes a sensor coupled to the crankshaft to provide a signal whose instantaneous frequency is proportional to the instantaneous crankshaft angular velocity.

25. The system as claimed in claim 22 or claim 23 wherein the means for measuring includes an analog circuit to obtain an analog of the angular velocity signal.

26. The system as claimed in claim 25 further comprising means for converting the analog of the angular velocity signal to an analog voltage signal which is a function of the frequency of the analog velocity signal.

27. The system as claimed in claim 26 wherein the means for filtering filters the analog voltage signal.

28. The system as claimed in claim 22 or claim 23 further comprising means for generating an average angular velocity signal which is proportional to the average angular velocity of the crankshaft.

29. The system as claimed in claim 28 wherein said means for filtering includes a variable band pass filter having a variable band determined as a function of average angular velocity to preserve the information required to detect misfires independent of r.p.m..

30. The system as claimed in claim 22 or claim 23 wherein a statistical pattern recognition algorithm is used for detecting at least one misfire cylinder based on the misfire signal.

31. The system as claimed in claim 22 or claim 23 wherein the means for calculating includes means for estimating the indicated torque provided by each cylinder based upon said measured crankshaft angular velocity in which the appropriate engine dynamics, including reciprocating inertia forces, are taken into account to obtain an indicated torque signal.

32. The system of claim 31 wherein the means for calculating includes means for determining the extrema of the indicated torque signal which extrema comprise the elements of the M-dimensional nonuniformity vector.

33. The system as claimed in claim 31 wherein the indicated torque signal has an analog waveform and wherein the means for calculating includes means for transforming the analog waveform of at least a portion of the indicated torque signal o to a frequency domain equivalent for each cylinder within each engine cycle, which frequency domain equivalents comprise the elements of the M-dimensional nonuniformity vector.

34. The system as claimed in claim 22 or claim 23 wherein the means for calculating includes means for determining the extrema of the filtered angular velocity signal, which extrema comprise the elements of the nonuniformity vector.

35. The system as claimed in claim 22 or claim 23 wherein the filtered analog velocity signal has an analog waveform and wherein the means for calculating includes means for transforming the analog waveform of at least a portion of the filtered analog velocity signal to a frequency domain equivalent.

36. The system as claimed in claim 35 further comprising means for determining at least one frequency related to a firing frequency of the engine and means for determining the portion of the frequency domain equivalent which is due to combustion energy effectively exciting the crankshaft at the at least one frequency to thereby account for the torque attributable to the reciprocating forces.

37. The system as claimed in claim 23 wherein the means for applying includes means for comparing the index of torque nonuniformity with a threshold value to obtain the misfire signal.

38. The system as claimed in claim 37 wherein whenever the index of torque nonuniformity exceeds the threshold value for any given engine cycle a misfire is declared, otherwise normal operation is determined for the given engine cycle.

39. The system as claimed in claim 37 wherein the threshold value is predetermined based on a predetermined statistical measure of the index of torque nonuniformity for both normal engine operation and an engine misfire.

40. The system as claimed in claim 37 or claim 39 further comprising means for generating an engine cycle signal as a function of the particular cycle of the engine and identifying at least one misfiring cylinder as a function of the engine cycle signal and the nonuniformity vector.

41. The system as claimed in claim 22 or claim 23 further comprising means for generating an engine cycle signal as a function of the particular cycle of the engine and means for identifying at least one misfiring cylinder as a function of the misfire signal and the nonuniformity vector.

42. The system as claimed in claim 22 or claim 23 further comprising means for detecting which of the cylinders has misfired based on the nonuniformity vector.

* * * * *

UNITED STATES PATENT AND TRADEMARK OFFICE
CERTIFICATE OF CORRECTION

PATENT NO. : 5,200,899

DATED : April 6, 1993

INVENTOR(S) : William B. Ribbens et al.

It is certified that error appears in the above-identified patent and that said Letters Patent is hereby corrected as shown below:

Column 2, line 44 "$(\Delta \nu = \theta_i - \theta_{i-1})$" should be --$(\Delta \theta = \theta_i - \theta_{i-1})$--;

Column 5, line 1 after "signal" and before "which", "V." should be --Vs,--;

Column 5, line 27, before "lugs" insert --of--;

Column 5, line 29 after "voltage", "v.(t)" should be --$v_s(t)$--;

Column 8, line 54 after "where" and before "is", insert --$\underline{n}$--;

Col. 9, line 16, after "at" and before "where" insert --$\lambda = \lambda_f$--;

Column 10, line 20 after "torque" and before "is", "T(b)" should be --$T(\theta)$--;

Column 10, line 57 "n=T-T1avu" should be --$\underline{n} = \underline{T} - T_{av}\underline{u}$--;

Column 11, line 11 after "of" and before "will", insert --$\underline{n}$--; and

UNITED STATES PATENT AND TRADEMARK OFFICE
CERTIFICATE OF CORRECTION

PATENT NO. : 5,200,899
DATED : April 6, 1993
INVENTOR(S) : William B. Ribbens et al It is certified that error appears in the above-indentified patent and that said Letters Patent is hereby corrected as shown below:

Col. 15, line 29, after "portion" and before "the", "o" should be deleted

Signed and Sealed this

Twelfth Day of April, 1994

BRUCE LEHMAN

*Commissioner of Patents and Trademarks*

*Attest:*

*Attesting Officer*